United States Patent
Takada

[19]

[11] Patent Number: 5,949,563
[45] Date of Patent: Sep. 7, 1999

[54] WAVELENGTH DIVISION MULTIPLEXING TRANSMITTER RECEIVER, OPTICAL TRANSMISSION SYSTEM, AND REDUNDANT SYSTEM SWITCHING METHOD

[75] Inventor: Tadayuki Takada, Yokohama, Japan

[73] Assignee: Fujitsu Limited, Kawasaki, Japan

[21] Appl. No.: 08/896,656

[22] Filed: Jul. 18, 1997

[30] Foreign Application Priority Data

Jan. 28, 1997 [JP] Japan ................................. 9-014258

[51] Int. Cl.⁶ ............................. H04J 14/02; H04B 10/08
[52] U.S. Cl. ......................... 359/124; 359/110; 359/152; 370/221
[58] Field of Search .................................... 359/110, 124, 359/152; 370/221, 225, 245

[56] References Cited

U.S. PATENT DOCUMENTS

| 4,306,313 | 12/1981 | Baldwin | 359/110 |
| 5,069,521 | 12/1991 | Hardwick | 359/110 |
| 5,299,293 | 3/1994 | Mestdagh et al. | 359/110 |
| 5,327,275 | 7/1994 | Yamane et al. | 370/221 |

*Primary Examiner*—Kinfe-Michael Negash
*Attorney, Agent, or Firm*—Staas & Halsey

[57] ABSTRACT

For wavelength division multiplexing transmission, a standby-system processor capable of handling all wavelengths is included in relation to a plurality of working system processors associated with different wavelengths. If any of the plurality of working system processors fails, the wavelength of a light wave to be processed by the standby-system processor is controlled according to the wavelength being handled by a current-system processor that has failed. A switching unit switches the working system processor that has failed to the standby-system processor.

13 Claims, 8 Drawing Sheets

PRIMARY SIGNAL DATA

WAVELENGTH DIVISION MULTIPLEXING TRANSMITTER RECEIVER, OPTICAL TRANSMISSION SYSTEM, AND REDUNDANT SYSTEM SWITCHING METHOD

BACKGROUND OF THE INVENTION

1. Field of the Invention

The present invention relates to a wavelength division multiplexing transmission technology for transmitting and receiving a plurality of light waves having different wavelengths over a single optical transmission line. More particularly, this invention is concerned with a wavelength-division multiplexing transmitter receiver having a redundant configuration, an optical transmission system, and a redundant system switching method.

2. Description of the Related Art

Technologies for effectively utilizing a wide frequency band of approximately 20 THz permitted by an optical fiber serving as an optical transmission line have been studied in years. In recent years, development of a technology for handling the wavelength of light including development of optical devices or the like has made progress, an increase in processing speed of an electronic circuit has come to a standstill, and an optical amplifier repeater has made its debut. For these reasons, there is some prospect of realizing a high-speed and large-capacity economic repeater transmission line through combination of a technology of wavelength division multiplexing (WDM) transmission, in which a plurality of light waves having different wavelengths are multiplexed and transmitted over one optical fiber, and a technology of optical amplification repeating transmission, in which the light waves to be multiplexed in wavelength are amplified simultaneously.

Various kinds of apparatuses designed for optical communication are expected to offer high reliability. In particular, apparatuses connected over a trunk are requested to guarantee higher reliability. In a WDM transmission approach, since a large amount of information can be transmitted by performing multiplexing relative to a plurality of wavelengths, it has a significant meaning whether or not high-reliability hardware can be realized.

For a known optical transmitter receiver for transferring a light wave having a single wavelength which has been adopted before the WDM transmission approach is established, a configuration in which, for example, an auxiliary system having the same configuration as a current system is included so that if the current system fails, it can be switched to the auxiliary system has been adopted as a redundant configuration for keeping line reliability high. Like the known redundant configuration, a WDM transmitter receiver may presumably include current systems and auxiliary systems, and thus guarantee high reliability. This redundant configuration includes current systems and auxiliary systems associated with wavelengths of light waves to be multiplexed.

According to the above redundant configuration, if for example, part of current systems for processing a light wave with a certain wavelength fails, the current system is switched to an auxiliary system. At this time, the other parts of the current systems for processing light waves with the other wavelengths (current systems that do not fail) are also switched to auxiliary systems. This poses a problem that use efficiency is poor and a transmitter receiver costs high.

SUMMARY OF THE INVENTION

Accordingly, an object of the present invention is to provide an inexpensive WDM transmitter receiver having a simple redundant configuration capable of ensuring high reliability and an optical transmission system, and to also provide a redundant system switching method for the WDM transmitter receiver.

A WDM transmitter receiver in accordance with the present invention for accomplishing the above object is a WDM transmitter receiver for transmitting and receiving a plurality of light waves having different wavelengths by combining and separating them. The WDM transmitter receiver comprises: a plurality of working system processing means, associated with the different wavelengths, for processing the plurality of light waves; a standby-system processing means capable of handling all the wavelengths of the plurality of light waves; a standby-system control means that if any of the plurality of working system processing means fails, produces a wavelength control signal which changes the wavelength of a light wave to be processed by the standby-system processing means according to the wavelength of a light wave being processed by a working system processing means that has failed; and a switching means for switching the working system processing means that has failed to the standby-system processing means.

Owing to the above configuration, a standby-system processing means capable of handling wavelengths being handled by a plurality of working system processing means is included in relation to the plurality of working system processing means associated with different wavelengths. If any of the plurality of working system processing means fails, the wavelength of a light wave to be processed by the standby-system processing means is controlled according to the wavelength being handled by a working system processing means that has failed. A switching means then switches the working system processing means that has failed to the standby-system processing means.

Compared with a redundant configuration in which current systems and auxiliary systems are included in one-to-one correspondence, the configuration of a standby-system processing means can be simplified. Consequently, a WDM transmitter receiver in which minimizing the scale and cost of the transmitter receiver has been achieved, and use efficiency and line reliability are retained high can be provided. The redundant configuration is independent of the number of concurrent wavelengths to be handled by a WDM system. Therefore, the larger the number of multiplex wavelengths is, the simpler the configuration of an auxiliary system gets relative to that of a current system. The effect of minimizing cost and improving reliability increases. In addition, upgrading the WDM system, such as, modifying the number of multiplex wavelengths can be coped with flexibly.

Moreover, the standby-system processing means may include a light-emitting unit capable of emitting a plurality of light waves having different wavelengths, and an emission wavelength control means for changing the wavelength of a light wave to be emitted by the light-emitting unit according to a wavelength control signal.

Specifically, if part of a working system processing means for transmitting a light wave fails, the wavelength of an optical output of the light-emitting unit in the standby-system processing means is controlled by the emission wavelength control unit according to the wavelength of a light wave being transmitted by the part of the working system processing means. The light-transmitting part of the working system processing means that has failed is then switched to the standby-system processing means.

Furthermore, the standby-system processing means includes a light-receiving unit capable of receiving a plurality of light waves having different wavelengths. In addition, the standby-system processing means may include a variation optical filter capable of varying the passband of wavelengths according to a wave control signal so that a light wave passing through the variation optical filter can be received by the light-receiving unit.

Owing to the above configuration, if part of a current-system processing means for receiving a light wave fails, the light-receiving part of the working system processing means is switched to a standby-system processing means including a light-receiving unit capable of receiving the light wave to be received by the light-receiving part. In addition, when the variation optical filter is included, only a light wave having the wavelength being handled by the working system processing means that has failed is received by the light-receiving unit. Accordingly, compared with a configuration in which a plurality of light waves with different wavelengths, which have propagated over an optical transmission line, are received directly by the light- receiving unit, the influence of noises is minimized, and a signal-to-noise ratio improves. Consequently, reception sensitivity can be raised. This is especially effective in coping with accumulated spontaneous emission light (ASE) noises stemming from long-distance systematization or multi-stage repeating realized with optical amplifiers, or with deterioration of reception sensitivity caused by various phenomena including the nonlinear effect of an optical fiber.

The WDM transmitter receiver may be configured to include an occurrence-of-failure conveying means for conveying occurrence of a failure in any of the plurality of working system processing means to a WDM transmitter receiver in a remote station connected over an optical transmission line. The occurrence-of-failure conveying means may include an occurrence-of-failure signal production unit for producing an occurrence-of-failure signal indicating that any of the plurality of working system processing means has failed, and a signal superposition unit for superposing the occurrence-of-failure signal on a multiplexed light wave to be transmitted over the optical transmission line. Alternatively, the occurrence-of-failure conveying means may be configured so that if any of the plurality of working system processing means fails, the occurrence of the failure is conveyed to the WDM transmitter receiver in the remote station on the basis of the intermittent discontinuity of the multiplexed light wave, which stems from the occurrence of the failure, being transmitted over the optical transmission line .

Specifically, since the occurrence-of-failure conveying means is included, switching performed in a local station with occurrence of a failure can be used to trigger inspection at a remote station. This is effective when the cause of a failure lies in a remote station or a whole WDM system employed. Moreover, when occurrence of a failure in a working system processing means is conveyed to a remote station with intermittent discontinuity of a multiplexed light wave, occurrence of a failure can be conveyed by a simpler configuration. Furthermore, the cost of a transmitter receiver can be minimized and the reliability thereof can be improved.

Moreover, a redundant system switching method for a WDM transmitter receiver including current systems and an auxiliary system in accordance with the present invention comprises: a local station switching step at which if a current system for processing one of a plurality of light waves fails, a wavelength to be handled by the auxiliary system in a local station is controlled according to the wavelength of the light wave, and the current system that has failed is switched to the auxiliary system in the local station; an occurrence-of-failure conveying step of conveying occurrence of a failure in the local station to a WDM transmitter receiver in a remote station connected over an optical transmission line; and a remote station switching step of controlling a wavelength to be handled by an auxiliary system in the remote station according to the occurrence of a failure conveyed from the local station, and switching a corresponding current system in the remote station to the auxiliary system in the remote station.

Herein, the occurrence-of-failure conveying step may include a step of producing an occurrence-of-failure signal indicating that a failure has occurred in the local station, and a step of superposing the occurrence-of-failure signal on a multiplexed light wave to be transmitted over the optical transmission line. Alternatively, at the occurrence-of-failure conveying step, occurrence of a failure in the local station may be conveyed to the remote station on the basis of the intermittent discontinuity of the multiplexed light wave, which stems from the occurrence of the failure, to be transmitted over the optical transmission line.

Concurrent switching in a local station and a remote station with occurrence of a failure can be achieved by the method described above, and this method is effective in a case that a source of failure is in the remote station or in the whole system currently used, therefore, can cope with various applications.

An optical transmission system in accordance with the present invention is an optical transmission system including at least first and second terminal stations each having a WDM transmitter receiver for transmitting and receiving a plurality of light waves with different wavelengths by combining and separating them. In the optical transmission system, the first and second terminal stations each comprise a plurality of working system processing means, associated with the wavelengths of the plurality of light waves, for processing the light waves, a standby-system processing means capable of handling all the wavelengths of the plurality of light waves, and a standby-system control means that if any of the plurality of working system processing means fails, produces a wavelength control signal which changes the wavelength of a light wave to be processed by the standby-system processing means according to the wavelength of a light wave being processed by a working system processing means that has failed, and a switching means for switching the working system processing means that has failed to the standby-system processing means.

According to the above configuration, in each of the first and second terminal stations, a standby-system processing means capable of handling wavelengths to be handled by a plurality of working system processing means is included in relation to the plurality of working system processing means associated with different wavelengths. If any of the plurality of working system processing means fails, the wavelength of a light wave to be handled by the standby-system processing means is controlled according to the wavelength being handled by a working system processing means that has failed. A switching means switches the working system processing means that has failed to the standby-system processing means.

Compared with a redundant configuration in which current systems and auxiliary systems are included in one-to-one correspondence in each terminal station, the above configuration makes it possible to simplify the configuration of the standby-system processing means. Consequently, the scale and cost of a WDM system can be minimized, and an optical transmission system enjoying high use efficiency and high circuit reliability can be provided. This redundant configuration is independent of the number of concurrent wavelengths to be handled by the WDM system. Therefore, the larger the number of multiplex wavelengths is, the simpler the configuration of an auxiliary system becomes relative to the configuration of a current system. The effect of minimizing cost and improving reliability increases. In addition, upgrading the WDM system, such as, modifying the number of multiplex wavelengths can be coped with flexibly.

Herein, the optical transmission system may include an occurrence-of-failure conveying means for conveying the fact that a failing working system processing means in the first terminal station will be switched to the standby-system processing means to the second terminal station. Furthermore, the second terminal station may be designed to detect failure information sent from the first terminal station and to switch the working system processing means to the standby-system processing means.

In other words, occurrence of a failure in the first terminal station is conveyed to the second terminal station by the occurrence-of-failure conveying means. Switching a corresponding working system processing means to the standby-system processing means in the second terminal station is carried out according to the failure information sent from the first terminal station.

As mentioned above, since the occurrence-of-failure conveying means is included, switching in a local station deriving from occurrence of a failure can be used to trigger inspection in a remote station. This is effective when the cause of a failure is present in a remote station or in a whole WDM system employed.

Other objects, features, and advantages of the present invention will be apparent from the description below of embodiments relevant to the appended drawings.

DESCRIPTION OF THE PREFERRED EMBODIMENTS

To begin with, a WDM transmission approach will be described briefly.

Figure 1:
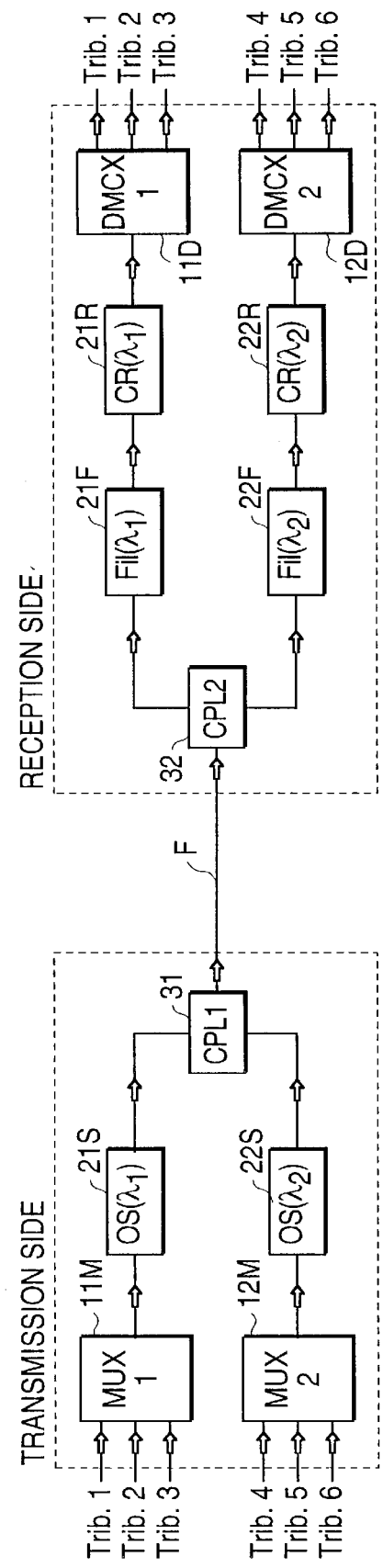
FIG. 1 is a diagram of an example of the system configuration conformable to a general WDM transmission approach.

FIG. 1 shows a typical example of the system configuration conformable to a general WDM transmission approach (for multiplexing two waves).

In FIG. 1, low-order group signals Trib.1 to Trib.6 that are six groups of electric waves are input in threes to multiplexers 11M and 12M (MUX1 and MUX2) in a transmission side, and multiplexed. Thereafter, the resultant signals are input to optical transmission units 21S and 22S (OS($\lambda$1) and OS($\lambda$2)), and converted electro-optically into light waves with wavelengths $\lambda$1 and $\lambda$2. These light waves are combined by an optical coupler 31 (CPL1) and then transmitted over an optical fiber F serving as an optical transmission line.

In a reception side, the light wave propagating over the transmission line is bifurcated by an optical coupler 32 (CPL2). From one of the light waves, only a light wave component with a wavelength $\lambda$1 is extracted by an optical filter 21F (Fil($\lambda$1)). Extracted light wave components are converted into electric waves by an optical reception unit 21R (OR($\lambda$1)), and separated into low-order group signals Trib.1 to Trib.3 by a demultiplexer 11D (DMUX1). The same applies to the other light wave. That is to say, the other light wave is recomposed into low-order group signals Trib.4 to Trib.6 by means of an optical filter 22F (Fil($\lambda$2)), an optical reception unit 22R (OR($\lambda$2)), and a demultiplexer 12D (DMUX2).

Figure 2:
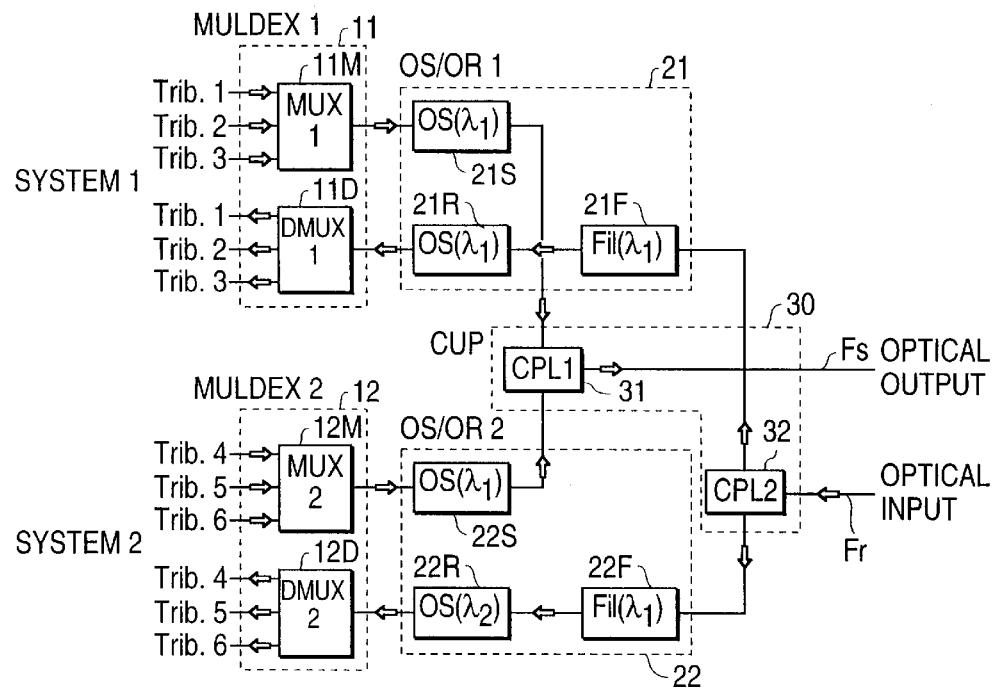
FIG. 2 is a block diagram showing the configuration of a transmitter receiver employed in the WDM transmission approach shown in FIG. 1.

FIG. 2 is a block diagram of a WDM transmitter receiver employed in the aforesaid WDM transmission system.

A WDM transmitter receiver shown in FIG. 2 has a configuration in which the transmission side and reception side shown in FIG. 1 are united. To be more specific, a multiplexer demultiplexer 11 (MULDEX1) that is a combination of the multiplexer 11M and demultiplexer 11D, and an optical transmission/reception unit 21 (OS/OR1) that is a combination of the optical transmission unit 21S, optical reception unit 21R, and optical filter 21F are included as a component (system 1) for processing a light wave with a wavelength $\lambda$1. Moreover, a multiplexer demultiplexer 12 (MULDEX2) that is a combination of the multiplexer 12M and demultiplexer 12D, and an optical transmission/reception unit 22 (OS/OR2) that is a combination of the optical transmission unit 22S, optical reception unit 22R, and optical filter 22F are included as a component (system 2) for processing a light wave with a wavelength $\lambda$2. Furthermore, an optical coupler unit 30 (CUP) that is a combination of the optical coupler 31 for combining and transmitting light waves with wavelengths $\lambda$1 and $\lambda$2 over an optical fiber Fs, and the optical coupler 32 for bifurcating a light wave propagating over the optical fiber Fr is also included.

Now, a redundant configuration including a current system and an auxiliary system will be discussed in relation to the foregoing WDM transmitter receiver.

Figure 3:
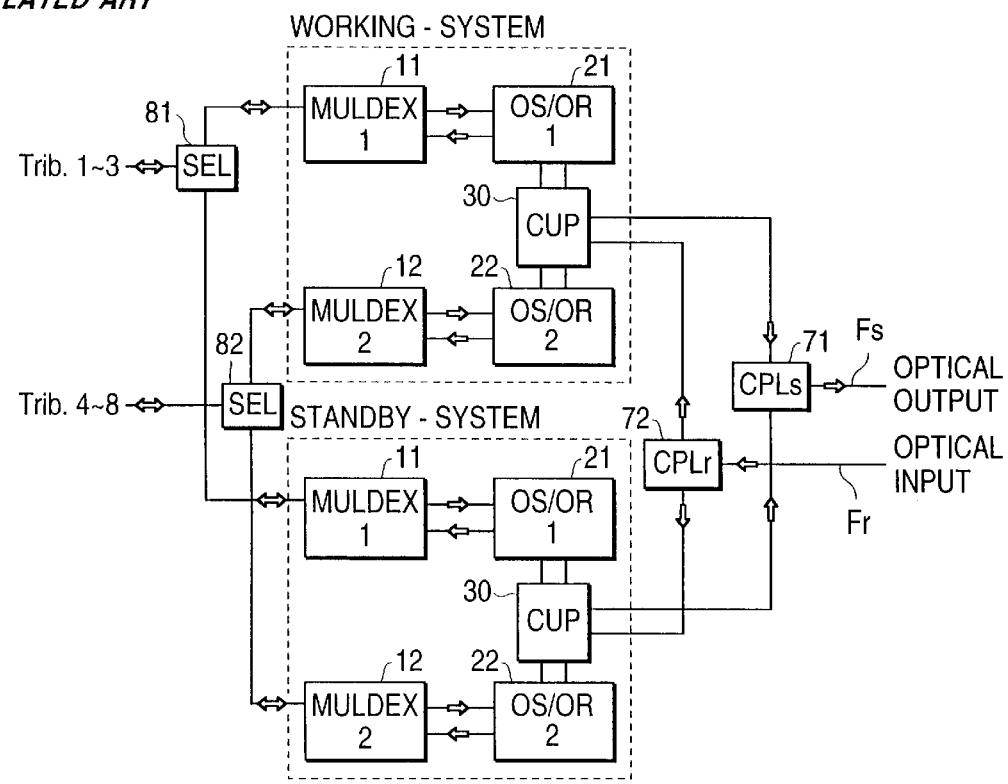
FIG. 3 is a block diagram showing an example of a redundant configuration adapted to the WDM transmitter receiver shown in FIG. 2.

FIG. 3 shows an example of a block diagram of a WDM transmitter receiver having a redundant configuration.

In a WDM transmitter receiver shown in FIG. 3, two systems each having the configuration shown in FIG. 2 are included. One of the systems is used as a current system, and the other system is used as an auxiliary system. In both the systems, high-order groups of signals (light waves) are combined by optical couplers 71 and 72 (CPLs and CPLr), and low-order groups of signals (electric waves) are combined by switching units 81 and 82 (SEL1 and SEL2).

In a normal operation mode, the optical transmission/reception units 21 and 22 in the auxiliary system are retained in a cold standby state. No light wave is output from the auxiliary system. If the current system fails, optical transmission units in the optical transmission/reception units 21 and 22 in the current system stop outputting a light wave. Instead, the optical transmission/reception units 21 and 22 in the auxiliary system retained in the cold standby state become active, and transmit and receive a light wave. A transmitted light wave is sent over the optical fiber Fs via the optical coupler 71, while a received light wave propagating over the optical fiber Fr is processed by the auxiliary system via the optical coupler 72. Responsively, the switching units 81 and 82 that have connected to low-order signal input/output ports of the current system before the occurrence of the failure select low-order group signal input/output ports in the auxiliary system. Thus, switching the current system to the auxiliary system is completed.

However, using the foregoing redundant configuration, for example, if the multiplexer demultiplexer 11 or optical transmission/reception unit 21 in the current system fails, the current system is switched to the auxiliary system. In this case, the multiplexer demultiplexer 12 and optical transmission/reception unit 22 in the current system which do not fail are also switched to those in the auxiliary system. Thus, use efficiency is poor and the transmitter receiver costs high. FIG. 3 shows the configuration in which two wavelengths are handled for multiplexing. As the number of concurrent wavelengths increases to be 4, 8, 16, etc., and n, the transmitter receiver gets larger in scale. Besides, since the number of components increases, this invites an increase in cost.

Embodiments of the present invention, which are realized in consideration of the above problems, will be described.

Figure 4:
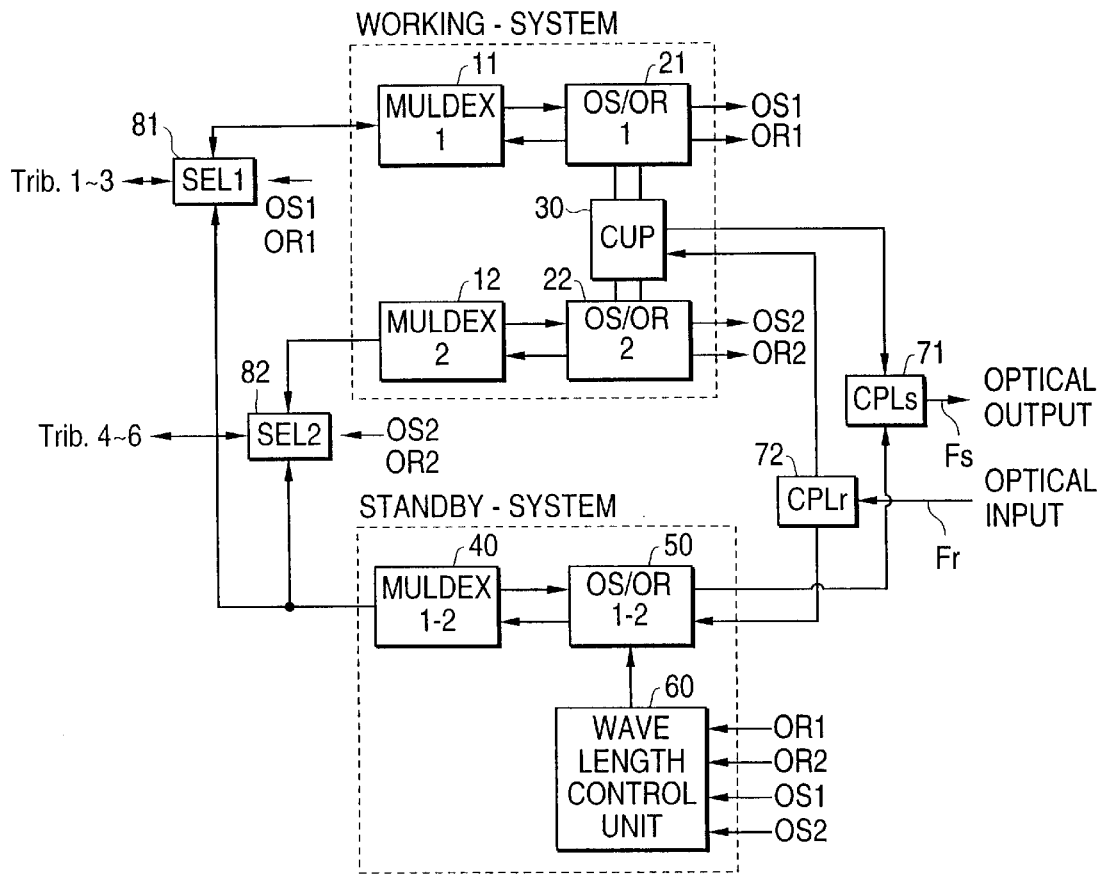
FIG. 4 is a block diagram showing the configuration of a WDM transmitter receiver of a first embodiment in accordance with the present invention.

FIG. 4 is a block diagram showing the configuration of a WDM transmitter receiver of a first embodiment in accordance with the present invention. In the first embodiment, a WDM transmitter receiver to be used when the number of concurrent wavelengths is two, that is, to be used for transmitting light waves with two different wavelengths $\lambda 1$ and $\lambda 2$ by performing wavelength multiplexing will be described.

In FIG. 4, the WDM transmitter receiver comprises, like the configuration of the current system shown in FIG. 3, a multiplexer demultiplexer 11 (MULDEX1) and optical transmission/reception unit 21 (OS/OR1) constituting a component (system 1) for processing a light wave with a wavelength $\lambda 1$, a multiplexer demultiplexer 12 (MULDEX2) and optical transmission/reception unit 22 (OS/OR2) constituting a component (system 2) for processing a light wave with a wavelength $\lambda 2$, and an optical coupler unit 30 (CUP) for combining or bifurcating light waves to be transmitted or received by the optical transmission/reception units 21 and 22. Thus, the system 1 and system 2 function as working system processing means.

An standby-system processing means includes a multiplexer demultiplexer 40 (MULDEX1-2), an optical transmission/reception unit 50 (OS/OR1-2) for selecting and processing one of the light waves with the wavelengths $\lambda 1$ and $\lambda 2$, and a wavelength control unit 60 serving as a standby-system control means for controlling changing of the wavelength of a light wave to be processed by the optical transmission/reception unit 50.

Furthermore, switching units 81 and 82 (SEL1 and SEL2) for switching low-order group signals Trib.1 to Trib.3 and Trib.4 to Trib.6 over to the multiplexer demultiplexers 11 and 12 in the current system or the multiplexer demultiplexer 40 in the auxiliary system, an optical coupler 71 (CPLS) for outputting a light wave transmitted from the optical coupler unit 30 in the current system or a light wave transmitted from the optical transmission/reception unit 50 in the auxiliary system over an optical fiber Fs serving as an optical transmission line used for transmission, and an optical coupler 72 (CPLr) for bifurcating a light wave propagating over an optical fiber Fr serving as an optical transmission line used for reception, and then transmitting resultant light waves to the optical coupler 30 in the current system and the optical transmission/reception unit 50 in the auxiliary system are included as a means for switching the current system to the auxiliary system.

The multiplexer demultiplexer 11 (12) is, like the one shown in FIG. 2, a combination of the capability of a multiplexer and the capability of a demultiplexer. The multiplexer demultiplexer 11 (12) multiplexes low-order group signals Trib.1 to Trib.3 (Trib.4 to Trib.6) input via the switching unit 81 (82), and outputs a resultant signal to the optical transmission/reception unit 21 (22). Moreover, the multiplexer demultiplexer 11 (12) derives the low-order group signals Trib.1 to Trib.3 (Trib.4 to Trib.6) from a light wave output from the optical transmission/reception unit 21 (22), and outputs the low-order group signals.

The optical transmission/reception unit 21 includes, like the one shown in FIG. 2, an optical transmission unit 21S, an optical reception unit 21R, and an optical filter 21F. The optical transmission unit 21S allows an external modulator or the like to modulate continuous-wave light with the wavelength $\lambda 1$, which is generated by, for example, a laser diode, according to a signal output from the multiplexer demultiplexer 11, and transmits resultant light to the optical coupler unit 30. The optical reception unit 21R uses a light-receiving device to receive a light wave passing through the optical filter 21F, converts it into an electric wave, and sends the electric wave to the multiplexer demultiplexer 11. The light-receiving device shall have sufficient sensitivity relative at least to light with the wavelength $\lambda 1$. Moreover, the optical transmission unit 21S and optical reception unit 21R include an optical output monitoring unit and optical input monitoring unit respectively which are not shown. The optical output monitoring unit and optical input monitoring unit output an optical output interception alarm signal OS1 and optical input interception alarm signal OR1 respectively to the wavelength control unit 60 and switching unit 81 respectively. The optical output interception alarm signal OS1 and optical input interception alarm signal OR1 make, for example, a low-to-high transition when no optical output or input is supplied because of occurrence of a failure. The optical filter 21F inputs one of light waves resulting from bifurcation performed on a light wave propagating over the optical fiber Fr by the optical coupler unit 30, extracts a component with the wavelength $\lambda 1$ from the input light, and sends the component to the optical reception unit 21R.

The optical transmission/reception unit 22 has the same configuration as the optical transmission/reception unit 21, but handles the wavelength $\lambda 2$ instead of the wavelength $\lambda 1$.

The description of the optical transmission/reception unit 22 will therefore be omitted.

The optical coupler unit 30 is, like the one shown in FIG. 2, a combination of an optical coupler 31 for combining light waves with the wavelengths λ1 and λ2, which are output from the optical transmission/reception units 21 and 22, and outputting a resultant light wave over the optical fiber Fs, and an optical coupler 32 for bifurcating a light wave propagating over the optical fiber Fr and outputting resultant light waves to the optical transmission/reception units 21 and 22.

The multiplexer demultiplexer 40 multiplexes low-order group signals Trib.1 to Trib.3 or low-order group signals Trib.4 to Trib.6, which are input responsively to switching of the switching units 81 and 82, outputs a resultant signal to the optical transmission/reception unit 50. Moreover, the multiplexer demultiplexer 40 derives the low-order group signals Trib.1 to Trib.3 or low-order group signals Trib.4 to Trib.6 from a light wave output from the optical transmission/reception unit 50, and outputs the low-order group signals Trib.1 to Trib.3 or low-order group signals Trib.4 to Trib.6.

Figure 5:
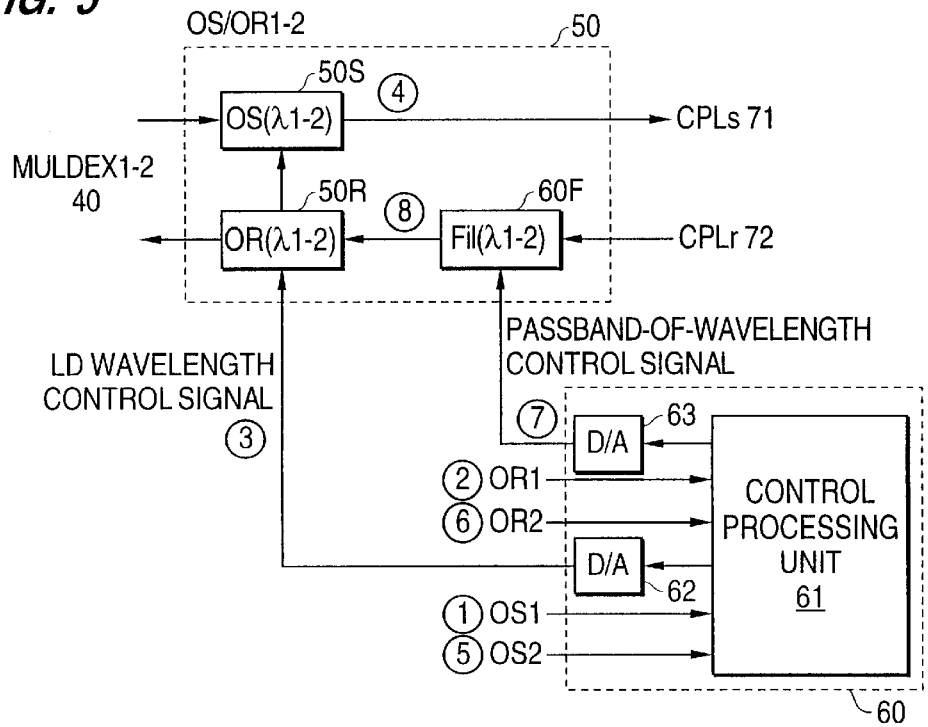
FIG. 5 is a block diagram showing the configuration of an optical transmission/reception unit and wavelength control unit in the first embodiment.

The optical transmission/reception unit 50 includes, as shown in FIG. 5, an optical transmission unit 50S (OS (λ1–2)) connected to the optical coupler 71, a variable passband-of- wavelengths optical filter 50F (Fil(λ1–2)) serving as a variable optical filter connected to the optical coupler 72, and an optical reception unit 50R (OR(λ1–2)) serving as a light reception unit connected to the variable passband-of- wavelengths optical filter 50F.

Figure 6A:
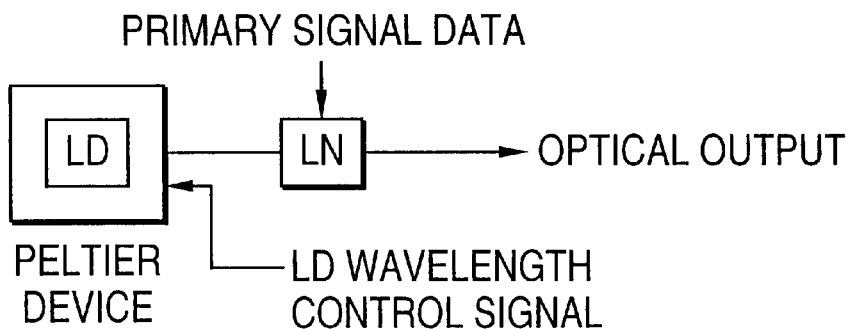
FIG. 6 is a diagram for explaining the optical transmission/reception unit in the first embodiment.
Figure 6B:
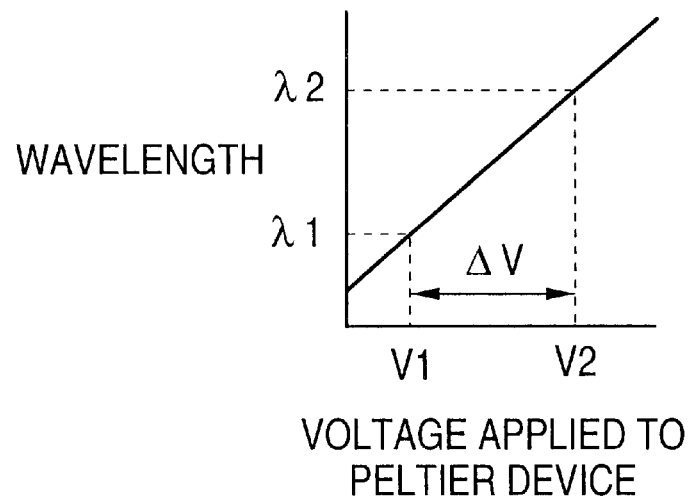

The optical transmission unit 50S includes, as shown in FIG. 6(a), a laser diode LD serving as a light-emitting unit, and an external modulator LN. The laser diode LD is driven according to an LD wavelength control signal, which will be described later, sent from the wavelength control unit 60, and the wavelength of an optical output of the laser diode LD is controlled according thereto. As a means for controlling the wavelength of an optical output, for example, a Peltier device is used to control the temperature of the laser diode LD in order to control the wavelength of an optical output so that the wavelength thereof is variable between the wavelengths λ1 and λ2. FIG. 6(b) shows an example of the characteristic of the wavelength of an optical output relative to a control voltage (proportional to the temperature of the laser diode LD) to be applied to the Peltier device. FIG. 6(b) shows an example in which the wavelength of an optical output changes substantially in proportion to the control voltage to be applied to the Peltier device, and the control voltage must be changed by a value ΔV (=V2−V1) in order to vary the wavelength from the value λ1 to λ2. An optical output of the laser diode LD is modulated by the external modulator LN according to a signal sent from the multiplexer demultiplexer 40, and then transmitted to the optical coupler 71. The technology for controlling temperature so as to control and vary the wavelength of an optical output of the laser diode LD has already been known. The means for controlling the wavelength of an optical output of the laser diode LD is not limited to the foregoing one. Alternatively, for example, a current or the like may be controlled so that the wavelength of an optical output will be variable.

The variable passband-of-wavelengths optical filter 50F is, for example, a known mechanical or electronic optical filter capable of varying the passband of wavelengths according to a passband-of-wavelengths control signal, which will be described later, output from the wavelength control unit 60. Herein, when a voltage v1 or v2 is applied to the variable passband-of-wavelengths optical filter 50F, the passband of wavelengths is changed to the wavelength λ1 or λ2. When a voltage v0 is applied, light is intercepted.

The optical reception unit 50R uses a light-receiving device, which is not shown, to receive a light wave passing through the variable passband-of-wavelengths optical filter 50F, converts it into an electric wave, and outputs the electric wave to the multiplexer demultiplexer 40. The light-receiving device shall have sufficient sensitivity relative at least to light with the wavelengths λ1 and λ2.

The wavelength control unit 60 inputs, as shown in FIG. 5, optical output interception alarm signals OS1 and OS2, and optical input interception alarm signals OR1 and OR2 which are output from the optical transmission/reception units 21 and 22. Based on these input signals, a control processing unit 61 produces LD wavelength control data and passband-of-wavelengths control data. The LD wavelength control data and passband-of-wavelength control data are converted into analog signals; the LD wavelength control signal and passband-of-wavelengths control signal by D/A converters 62 and 63, and then sent to the optical transmission/reception unit 50.

When a high-level optical output interception alarm signal OS1 or a high-level optical input interception alarm signal OR1 is input, the LD wavelength control signal is used to drive the optical transmission unit 50S and to apply a voltage V1 to the Peltier device in order to control the wavelength of an optical output so that the wavelength thereof will be set to the wavelength λ1. By contrast, when a high-level optical output interception alarm signal OS2 or a high-level optical input interception alarm signal OR2 is input, the optical transmission unit 50S is driven, and a voltage V2 is applied to the Peltier device in order to control the wavelength of an optical output so that the wavelength thereof will be set to the wavelength λ2. In any other case, that is, in a normal state in which the optical output interception alarm signals OS1 and OS2 and the optical input interception alarm signals OR1 and OR2 are low, the optical transmission unit 50S is brought to a cold standby state.

When a high-level optical output interception alarm signal OS1 or high-level optical input alarm signal OR1 is input, the passband-of-wavelengths control signal is used to apply a voltage v1 to the variable passband-of-wavelengths optical filter 50F and thus control the passband of wavelengths so that the passband of wavelengths will be set to the wavelength λ1. By contrast, when a high-level optical output interception alarm signal OS2 or high-level optical input interception alarm signal OR2 is input, a voltage v2 is applied to the variable passband-of-wavelengths optical filter 50F in order to control the passband of wavelengths so that the passband of wavelengths will be set to the wavelength λ2. In the normal state, as mentioned above, a voltage v0 is applied to the variable passband-of-wavelengths optical filter 50F in order to intercept light.

When the optical output interception alarm signal OS1 (OS2) and optical input interception alarm signal OR1 (OR2) are low, the switching unit 81 (82) transmits low-order group signals Trib.1 to Trib.3 (Trib.4 to Trib.6) to the multiplexer demultiplexer 11 (12). When the optical output interception alarm signal OS1 (OS2) or optical input interception alarm signal OR1 (OR2) is driven high, switching is carried out so that the low-order group signals Trib.1 to Trib.3 (Trib.4 to Trib.6) will be transmitted to the multiplexer demultiplexer 40.

Next, operations carried out in accordance with the first embodiment will be described.

To begin with, a state in which the components of the WDM transmitter receiver operate normally will be discussed. In this case, low-order group signals Trib.1 to Trib.3 and Trib.4 to Trib.6 pass through the switching units 81 and 82, are input to the working system multiplexer demultiplexers 11 and 12, multiplexed, and then sent to the optical transmission/reception units 21 and 22. The optical transmission/reception units 21 and 22 output light waves with the wavelengths $\lambda 1$ and $\lambda 2$, which have been modulated according to the signals sent from the multiplexer demultiplexer 11 and 12, to the optical coupler unit 30. The light waves with the wavelengths $\lambda 1$ and $\lambda 2$ are combined by the optical coupler unit 30, and then sent over the optical fiber Fs via the optical coupler 71. At this time, since the standby-system optical transmission unit 50S is retained in a cold standby state, only the light wave sent from the current system is input to the optical coupler 71.

A light wave propagating over the optical fiber Fr and containing components with the wavelengths $\lambda 1$ and $\lambda 2$ is bifurcated by the optical coupler 72, and sent to the current system and auxiliary system. At this time, since the variable passband-of-wavelengths optical filter 50F is in a state for intercepting light, the auxiliary system does not receive a light wave from the optical coupler 72. In the current system, the light wave output from the optical coupler 72 is bifurcated by the optical coupler unit 30 and then sent to the optical transmission/reception units 21 and 22. In the optical transmission/reception units 21 and 22, the optical filters 21F and 22F extract the components with the wavelengths $\lambda 1$ and $\lambda 2$ from in the light waves sent from the optical coupler unit 30. Thereafter, the optical reception units 21R and 22R convert the components opti electrically, and then send resultant electric waves to the multiplexer demultiplexers 11 and 12. The multiplexer demultiplexers 11 and 12 derives low-order group signals Trib.1 to Trib.3 and low-order group signals Trib.4 to Trib.6 respectively from the electric waves sent from the optical transmission/reception units 21 and 22, and provide the low-order group signals as output signals to an external unit via the switching units 81 and 82.

As mentioned above, in a normal operation mode, since the working system optical transmission/reception units 21 and 22 each generate an optical output and optical input, and allow the optical output monitoring unit and optical input monitoring unit to sense the optical output and input, the optical output interception alarm signals OS1 and OS2, and the optical input interception alarm signals OR1 and OR2 are driven low. These states are listed in the columns concerning the normal operation mode in Table 1. In Table 1, the alarm signals and control signals, and the wavelength at which the auxiliary system operates are classified and written down in the transmission-related columns and reception-related columns. Numerical characters in the column "Item" correspond to the numerical characters in FIG. 5.

TABLE 1

| Unit | Item | Signal & Operating wavelength | Normal state | Both systems fail | System 2 fails | System 2 fails |
|---|---|---|---|---|---|---|
| | | Optical output interception alarm signal OS1 | Low | High | High | Low |

TABLE 1-continued

| Unit | Item | Signal & Operating wavelength | Normal state | Both systems fail | System 2 fails | System 2 fails |
|---|---|---|---|---|---|---|
| | | Optical output interception alarm signal OS2 | Low | High | Low | High |
| | | LD wavelength control signal | V0 | V0 | V1 | V2 |
| | | Wavelength of output of optical transmission unit OS ($\lambda 1$–2) | Not emitted | Not emitted | $\lambda 1$ | $\lambda 2$ |
| | | Optical input interception alarm signal OR1 | Low | High | High | Low |
| | | Optical input nterception alarm signal OR2 | Low | High | Low | High |
| | | Passband-of-wavelengths control signal | v0 | v0 | v1 | v2 |
| | | Wavelength passed by variable optical filter Fil ($\lambda 1$–2) | Intercepted | Intercepted | $\lambda 1$ | $\lambda 2$ |

Next, a situation in which a failure occurs in the current system will be discussed. The situation in which a failure occurs includes, as listed in Table 1, a situation in which both systems 1 and 2 fail and a situation in which either system 1 or 2 fails. This embodiment adopts the redundant configuration in which if one of the systems fails, the current system that has failed is switched to the auxiliary system. Accordingly, if both the systems should fail, the optical output interception alarm signals OS1 and OS2, and the optical input interception alarm signals OR1 and OR2 would be driven high. In this case, the transmitter receiver would stop operating. A practical example of the situation in which both the systems fail is presumably a situation in which the optical transmission/reception units 21 and 22 break down simultaneously or a situation in which no optical input is supplied to both the systems because of disconnection of the optical fiber Fr.

To begin with, if system 1 fails, since at least one of an optical output and optical input is not supplied from or to the optical transmission/reception unit 21, the optical output interception alarm signal OS1 and optical input interception alarm signal OR1 are driven high (See the columns concerning "System 1 fails" in Table 1) and sent to the wavelength control unit 60 and switching unit 81.

In the wavelength control unit 60, the control processing unit 61 produces LD wavelength control data and passband-of-wavelengths control data on the basis of the high-level optical output interception alarm signal OS1 and high-level optical input interception alarm signal OR1. The LD wavelength control data is converted into an analog LD wavelength control signal by the D/A converter 62. The LD wavelength control signal is used to drive the auxiliary-system optical transmission unit 50S and to apply a voltage V1 to the Peltier device in order to control the wavelength of an optical output so that the wavelength thereof will be set to the wavelength $\lambda 1$. The passband-of-wavelengths control data is converted into an analog passband-of-wavelengths control signal by the D/A converter 63. The passband-of-wavelengths control signal is used to apply a voltage v1 to the variable passband-of-wavelengths optical filter 50F in order to control the passband of wavelengths so that the passband of wavelengths will be set to the wavelength $\lambda 1$.

The switching unit 81 switches the transmission route of low-order group signals Trib.1 to Trib.3 from the multiplexer demultiplexer 11 to the multiplexer demultiplexer 40 in response to a high-level optical output interception alarm signal OS1 and optical input interception alarm signal OR1.

Owing to the foregoing operations, the auxiliary system operates on behalf of current system 1 that has failed. The standby-system optical transmission unit 50S outputs a light wave with the wavelength $\lambda 1$, and the optical coupler 71 combines the light wave with a light wave with the wavelength $\lambda 2$ sent from the current system 2, and transmits a resultant light wave. A light wave propagating over the optical fiber Fr is bifurcated by the optical coupler 72, and sent to the current system 2 and auxiliary system. In the auxiliary system, the variable passband-of-wavelengths optical filter 50F extracts a light wave component with the wavelength $\lambda 1$, and the optical reception unit 50R and multiplexer demultiplexer 40 separate low-order group signals Trib.1 to Trib.3. In the current system, low-order group signals Trib.4 to Trib.6 are separated in the same manner as they are in a normal state. The low-order group signals Trb.1 to Trib.3 and Trib.4 to Trib.6 are output to outside of the transmitter receiver via the switching unit 82.

Next, if system 2 fails, since at least one of an optical output and optical input of the optical transmission/reception unit 22 is not supplied, the optical output interception alarm signal OS2 and optical input interception alarm signal OR2 are driven high (See the columns concerning "System 2 fails" in Table 1), and then sent to the wavelength control unit 60 and switching unit 82.

The wavelength control unit 60 allows the control processing unit 61 and D/A converters 62 and 63 to produce an LD wavelength control signal and passband-of-wavelengths control signal in response to the high-level optical output interception alarm signal OS2 and optical input interception alarm signal OR2. The LD wavelength control signal is used to drive the optical transmission unit 50S and to apply a voltage V2 to the Peltier device in order to control the wavelength of an optical output so that the wavelength thereof will be set to the wavelength $\lambda 2$. The passband-of-wavelengths control signal is used to apply a voltage v2 to the standby-system variable passband-of-wavelengths optical filter 50F in order to control the passband of wavelengths so that the passband of wavelengths will be set to the wavelength $\lambda 2$.

The switching unit 82 switches the transmission route of low-order group signals Trib.4 to Trib.6 from the multiplexer demultiplexer 12 to the multiplexer demultiplexer 40 in response to a high-level optical output interception alarm signal OS2 and optical input interception alarm signal OR2.

Owing to the foregoing operations, the auxiliary system operates on behalf of current system 2 that has failed. The standby-system optical transmission unit 50S outputs a light wave with the wavelength $\lambda 2$. The optical coupler 71 combines the light wave with a light wave with the wavelength $\lambda 1$ output from current system 1, and transmits a resultant light wave over the optical fiber Fs. A light wave propagating over the optical fiber Fr is bifurcated by the optical coupler 72 and sent to the current system 1 and auxiliary system. In the auxiliary system, the variable passband-of-wavelengths optical filter 50F extracts a light wave component with the wavelength $\lambda 2$, and the optical reception unit 50R and multiplexer demultiplexer 40 separate low-order group signals Trib.4 to Trib.6. In the current system 1, low-order group signals Trib.1 to Trib.3 are separated in the same manner as they are in a normal state. These low-order group signals Trib.1 to Trib.3 and Trib.4 to Trib.6 are output to outside of the transmitter receiver via the switching unit 81.

As mentioned above, according to the first embodiment, an auxiliary system for processing a light wave with a certain wavelength is included in relation to a current system for processing light waves with two different wavelengths $\lambda 1$ and $\lambda 2$. If a component in the current system for handling one of the wavelengths fails, a wavelength to be handled by the auxiliary system is controlled according to the one wavelength. The current system that has failed is then switched to the auxiliary system. This obviates the necessity of including working system components and standby-system components in one-to-one correspondence. The auxiliary system can therefore be configured simply. Consequently, a WDM transmitter receiver whose scale and cost has been minimized and which enjoys high use efficiency and high circuit reliability can be provided. Moreover, since the variable passband-of-wavelengths optical filter 50F is included in the reception stage in the auxiliary system, only light waves with the wavelength $\lambda 1$ or $\lambda 2$ are received by the optical reception unit 50R. Compared with a configuration in which only a light-receiving device, of which quantum efficiency is plotted substantially flat relative to a wavelength employed, is used to make the optical reception unit 50R compatible with certain wavelengths, this configuration makes it possible to minimize the influence of noises, improve a signal-to-noise ratio, and raise reception sensitivity. This is especially effective in coping with deterioration of reception sensitivity caused by various phenomena such as accumulated spontaneous emission light (ASE) noises stemming from long-distance systematization or multi-stage repeating realized with optical amplifiers, or by a nonlinear effect exerted by an optical fiber.

Next, a second embodiment of the present invention will be described.

In the second embodiment, a WDM transmitter receiver in which the number of concurrent wavelengths is n will be discussed.

Figure 7:
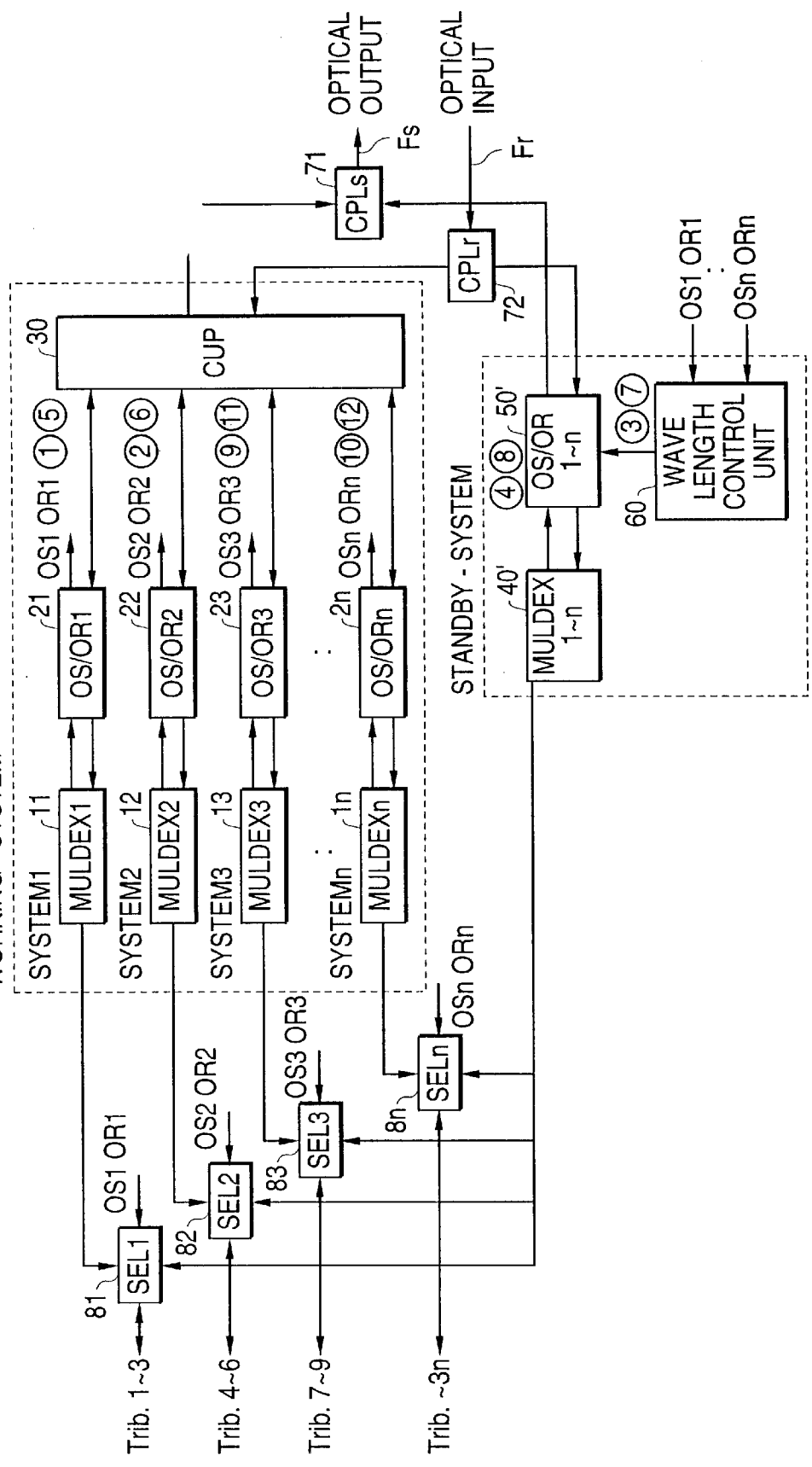
FIG. 7 is a block diagram showing the configuration of a WDM transmitter receiver of a second embodiment in accordance with the present invention.

FIG. 7 is a block diagram showing the configuration of a WDM transmitter receiver of the second embodiment. Components identical to those in the first embodiment shown in FIG. 4 are assigned the same reference numerals. The description of the components will be omitted.

In FIG. 7, the WDM transmitter receiver has a current system composed of systems 1 to n for processing light waves with wavelengths $\lambda 1$ to $\lambda n$, and an optical coupler unit 30 for combining or separating light waves transmitted and received by the systems. The configuration of systems 1 to n is identical to that of systems 1 and 2 in the first embodiment. Numerical characters corresponding to system numbers are appended to the symbols denoting components of the systems.

Moreover, a multiplexer demultiplexer 40' (MULDEX1-n), an optical transmission/reception unit 50' (OS/OR1-n) for selecting one of the light waves with the wavelengths $\lambda 1$ to $\lambda n$, and processing the selected one, and a wavelength control unit 60 for controlling changing of the wavelength of a light wave to be processed by the optical transmission/reception unit 50' are included as an auxiliary system. The multiplexer demultiplexer 40' multiplexes or separates three groups of signals out of low-order group signals Trib.1 to Trib.3$n$ responsively to switching by switching units 81 to 8$n$ (SEL1 to SELn). The optical transmission/reception unit 50' has components that are similar to those of the optical transmission/reception unit 50 in the first embodiment, and that are designed to be able to handle the wavelengths λ1 to λn.

Operations carried out in accordance with the second embodiment having the above components are basically identical to those carried out in accordance with the first embodiment except that the number of concurrent waves has increased from two to n. States of signals and the like indicating the operations in the second embodiment are listed in Table 2. The description of the operations will be omitted. Noted is that V1 to Vn in Table 2 denote voltages to be applied to the Peltier device in order to control the wavelength of an optical output so that the wavelength thereof will be set to the wavelengths λ1 to λn, and v1 to vn denote voltages to be applied to the variable passband-of-wavelengths optical filter (Fil(λ1-n)) in order to give control the passband of wavelengths so that the passband of wavelengths will be set to the wavelengths λ1 to λn.

TABLE 2

| Unit | Item | Signal & Operating wavelength | Normal state | System 1 fails | System 2 fails | System 3 fails | ... | System n fails |
|------|------|-------------------------------|--------------|----------------|----------------|----------------|-----|----------------|
| | | Optical output interception alarm signal OS1 | Low | High | Low | Low | ... | Low |
| | | Optical input interception alarm signal OS2 | Low | Low | High | Low | ... | Low |
| | | Optical output interception alarm signal OS3 | Low | Low | Low | High | ... | Low |
| | | Optical output interception alarm signal OSn | Low | Low | Low | Low | ... | High |
| | | LD wavelength control signal | V0 | V1 | V2 | V3 | ... | Vn |
| | | Wavelength of output of optical transmission unit OS (λ1-n) | Not emitted | λ1 | λ2 | λ3 | ... | λn |
| | | Optical input interception alarm signal OR1 | Low | High | Low | Low | ... | Low |
| | | Optical input interception alarm signal OR2 | Low | Low | High | Low | ... | Low |
| | | Optical input interception alarm signal OR3 | Low | Low | Low | High | ... | Low |
| | | Optical input interception alarm signal ORn | Low | Low | Low | Low | ... | High |
| | | Passband-of-wavelengths control signal | v0 | v1 | v2 | v3 | ... | vn |
| | | Wavelength passed by variable filter Fil (λ1-n) | Intercepted | λ1 | λ2 | λ3 | ... | λn |

As mentioned above, according to the second embodiment, when the number of multiplex wavelengths is n, an auxiliary system for processing a light wave with a certain wavelength is included in relation to current systems 1 to n for processing light waves with wavelengths λ1 to λn. If any of the current systems fails, a wavelength to be handled by the auxiliary system is controlled according to the wavelength being handled by a current system that has failed, and the current system that has failed is switched to the auxiliary system. The same advantages as those provided by the first embodiment can therefore be exerted. Thus, the redundant configuration of the WDM transmitter receiver is independent of the number of multiplex wavelengths to be handled by a wavelength multiplexing system. Therefore, the larger the number of multiplex wavelengths is, the simpler the configuration of the auxiliary system becomes relative to the configuration of the current systems. The effect of minimizing cost and improving reliability increases. Moreover, upgrading the wavelength multiplexing system, such as, modifying the number of multiplex wavelengths can be coped with flexibly.

In the second embodiment, an auxiliary system for handling one wavelength is included in relation to current systems 1 to n. Alternatively, a plurality of configurations each having the same configuration as the auxiliary system (however, the number of configurations is smaller than the number of wavelengths, n) may be included so that a plurality of failing systems can be coped with.

Next, the third embodiment of the present invention will be described.

The third embodiment is concerned with a WDM transmitter receiver in which the number of multiplex wavelengths is, similarly to that in the first embodiment, two. If a failure occurs, a signal indicating a state in which a failing system in a local station is switched to an auxiliary system therein is transmitted to a remote station, and a corresponding system in the remote station is also switched to an auxiliary system therein. This configuration can be regarded as an optical transmission system having the local station as a first terminal station and the remote station as a second terminal station.

Figure 8:
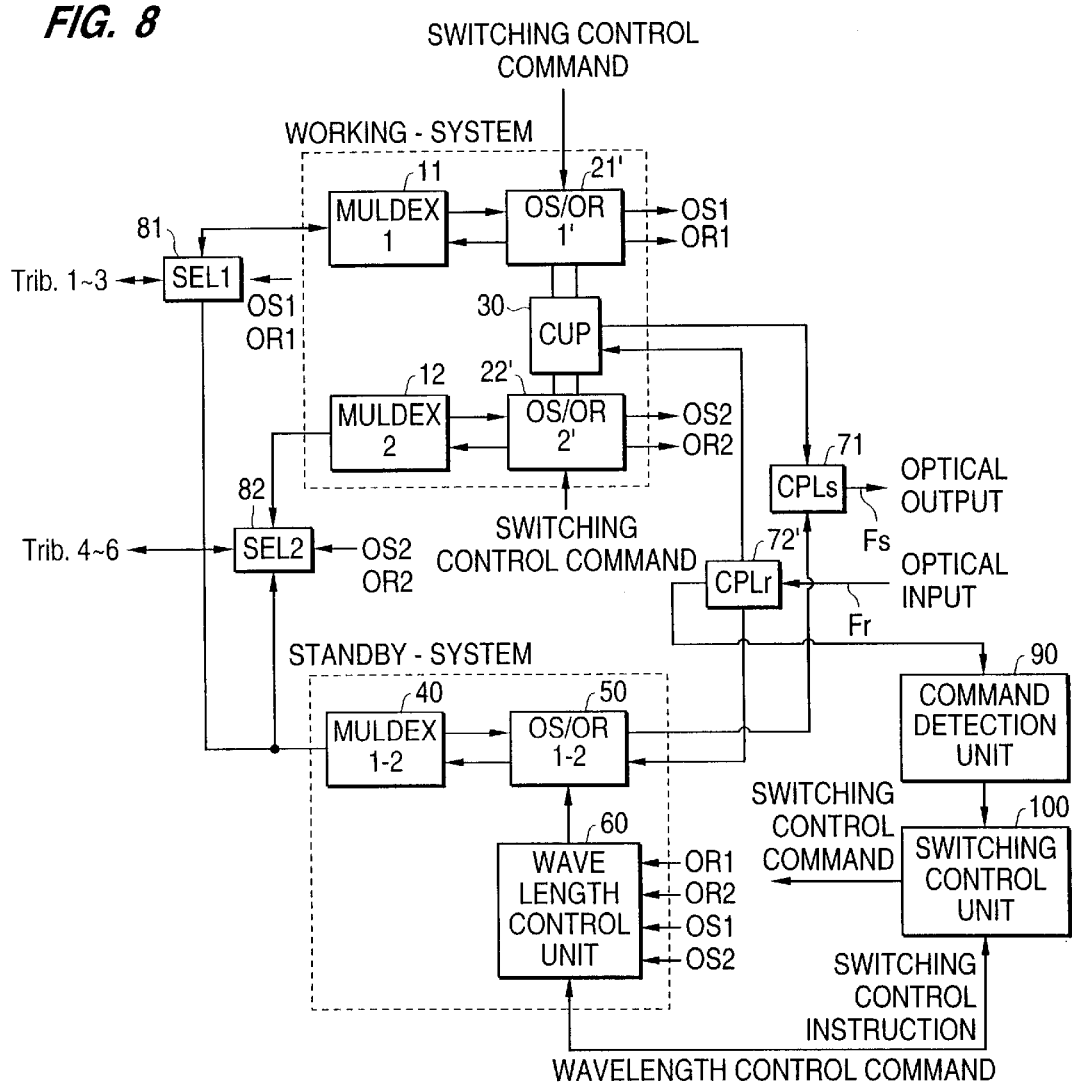
FIG. 8 is a block diagram showing the configuration of a WDM transmitter receiver of a third embodiment in accordance with the present invention.

FIG. 8 is a block diagram showing the configuration of a WDM transmitter receiver of the third embodiment. Components identical to those in the first embodiment shown in FIG. 4 are assigned the same reference numerals. The description of the components will be omitted.

In FIG. 8, the configuration of the WDM transmitter receiver is different from that in the first embodiment in points that an optical coupler 72' for trisecting a light wave propagating over the optical fiber Fr is substituted for the optical coupler 72, and that a command detection unit 90 for inputting one of light waves output from the optical coupler 72' and detecting a switching control command, which will be described later, serving as an occurrence-of-failure signal, and a switching control unit 100, which serves as an occurrence-of-failure signal production unit, for sending a wavelength control command to the wavelength control unit 60 on the basis of the detected switching control command, and sending a switching control command to optical transmission/reception units 21' and 22' (OS/OR1' and OS/OR2') in the current system according to a switching control instruction sent from the wavelength control unit 60 are included. In the optical transmission/reception units 21' and 22', the configuration of optical transmission units 21S' and 22S' is, as described later, different from that of the optical transmission units 21S and 22S in the first embodiment. The other components are identical to those in the first embodiment.

Figure 9:
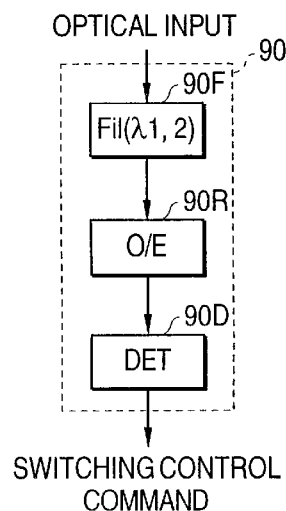
FIG. 9 is a block diagram showing the configuration of a command detection unit in the third embodiment.

The command detection unit 90 includes, as shown in FIG. 9, an optical filter 90F (Fil(λ1, 2)) for extracting light wave components with wavelengths λ1 and λ2 from a light wave output from the optical coupler 72', a light-receiving unit 90R (O/E) for receiving a light wave having passed through the optical filter 90F and converting it into an electric wave, and a detector 90D (DET) for detecting a switching control command sent from a remote station on the basis of the photo-electrically converted wave, and outputting the command to the switching control unit 100. The light-receiving unit 90R is a light-receiving unit having a bandwidth characteristic that covers the frequency of a carrier, which will be described later, modulated according to the switching control command.

The switching control unit 100 produces a wavelength control command on the basis of the switching control command sent from the remote station and detected by the command detection unit 90, and transmits it to the wavelength control unit 60. The wavelength control command is a command used to control the wavelength to be handled by an auxiliary system in a local station according to the switched state in a remote station which is expressed by the switching control command. A switching control instruction indicating that a current system in a local station has failed and been switched to an auxiliary system is sent from the wavelength control unit 60. Based on the switching control instruction, the switching control unit 100 produces a switching control command to be transmitted to the remote station and transmits it to the optical transmission/reception units 21' and 22'.

Figure 10:
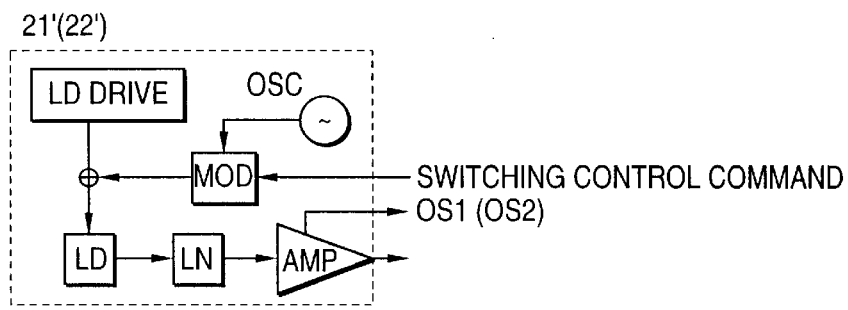
FIG. 10 is a block diagram showing the configuration of an optical transmission unit in the third embodiment.

The optical transmission unit 21S' includes, as shown in FIG. 10, an internal oscillator OSC, a mixing modulator MOD, an LD drive DRV, and an optical amplifier AMP in addition to a laser diode LD and external modulator LN which are identical to those of the optical transmission unit 21S (FIG. 3) in the first embodiment. A switching control command sent from the switching control unit 100 is mixed with a carrier, of which frequency is, for example, 10 MHz and which is supplied from the internal oscillator OSC, by the mixing modulator MOD. A resultant signal is superposed on an LD driving signal produced by the LD drive DRV. The LD driving signal on which the switching control command is superposed is used to drive the laser diode LD, whereby a light wave directly modulated according to the switching control command is generated. The light wave is then modulated by the external modulator LN according to primary signal data, amplified by the optical amplifier AMP, and then transmitted to the optical coupler unit 30. The optical transmission unit 21S' thus serves as a signal superposition unit. Incidentally, by monitoring an optical output of the optical amplifier AMP, an optical output interception alarm signal OS1 is produced in the same manner as that in the first embodiment.

Moreover, the configuration of the optical transmission unit 22S' is identical to that of the optical transmission unit 21S'. The description of the configuration will therefore be omitted.

A switching control command, and light waves generated by the optical transmission units 21S' and 22S' will be described more particularly.

Figure 11A:
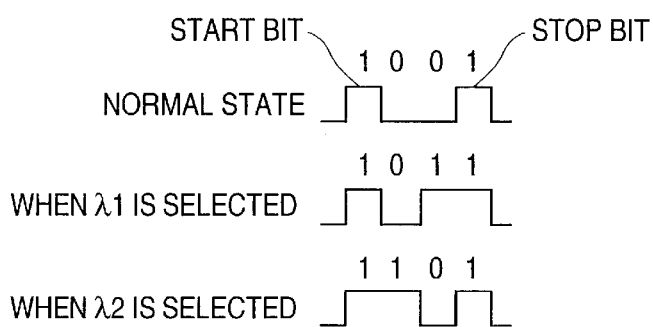
FIG. 11 is a diagram showing waveforms of signals occurring in the third embodiment.

To begin with, the switching control command is, as shown in FIG. 11(a), for example, a four-bit digital signal indicating a switched state in the auxiliary system. The first and last bits of the four bits are start and stop bits indicating the start and end of a switching control command. Two intermediate bits indicate a switched state. A state in which no failure occurs and no current system is switched to the auxiliary system is indicated with a bit stream of, for example, (1,0,0,1). A state in which current system 1 fails and a wavelength to be handled by the auxiliary system is set to the wavelength λ1 is indicated with a bit stream of, for example, (1,0,1,1). A state in which current system 2 fails and the wavelength to be handled by the auxiliary system is set to the wavelength λ2 is indicated with a bit stream of, for example, (1,1,0,1).

Figure 11B:
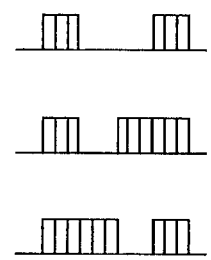

When the foregoing switching control command is sent from the switching control unit 100 to the optical transmission units 21S' and 22S', the mixing modulator MOD mixes the command with a carrier so as to modulate the carrier. The mixing is illustrated in FIG. 11(b). The switching control command component is expressed with the envelope of the carrier.

Figure 11C:
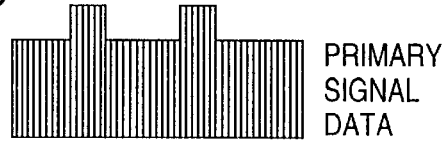

Furthermore, the waveform of an optical output produced by the LD drive, which is driven with an LD driving signal on which the carrier modulated with the switching control command is superposed, and modulated externally by the external modulator LN is shown schematically in FIG. 11(c). Apparently, the light intensity (amplitude) of a primary signal data component modulated at a high speed varies depending on the carrier.

Next, the operations in the third embodiment in accordance with the present invention will be described.

Similarly to the operations carried out in accordance with the first embodiment, if one of current systems in a local station fails, a high-level optical output interception alarm signal and high-level optical input interception alarm signal indicating the failing system are sent to the wavelength control unit 60. A wavelength to be handled by the auxiliary system is then controlled, and the failing system is switched to the auxiliary system. Concurrently, the wavelength control unit 60 sends a switching control instruction, of which contents depend on a state in which switching to the auxiliary system is carried out, to the switching control unit 100. Based on the switching control instruction, the switching control unit 100 produces a switching control instruction shown in FIG. 11(a). This control command is input to the optical transmission/reception units 21' and 22'. The optical transmission/reception units 21' and 22' each send an optical output shown in FIG. 11(c) to the optical coupler unit 30. The sent optical outputs are combined by the optical coupler unit 30, and sent over the optical fiber Fs via the optical coupler 71. Information concerning a failure occurring in the local station is thus conveyed to a remote station by a light wave propagating over the optical fiber Fs.

In a remote station having the same configuration as the local station, the light wave containing the switching control command and propagating over the optical fiber Fr is trisected by the optical coupler 72'. One of the three portions of the trisected light wave is sent to the command detection unit 90, and the other two portions are sent to the current system and auxiliary system in the same manner as those in the first embodiment. In the command detection unit 90, an optical filter 90F inputs a light wave output from the optical coupler 72', and extracts light wave components with wavelengths λ1 and λ2 from the light wave. The light wave passing through the optical filter 90F is converted into an electric wave by a light-receiving unit 90R. The light-receiving unit 90R has a bandwidth characteristic that covers the frequency (10 MHz) of a carrier. Only a carrier component contained in a received light wave is therefore converted photo-electrically. An output of the light-receiving unit 90R is like the one shown in FIG. 11(b). The output of the light-receiving unit 90R is input by the detector 90D, whereby the switching control command is demodulated and sent to the switching control unit 100. An output of the detector 90D is like the one shown in FIG. 11(*a*).

The switching control unit 100 recognizes a state, in which a current system in a local station is switched to the auxiliary system, on the basis of the switching control command detected by the command detection unit 90, produces a wavelength control command used to control the wavelength to be handled by the auxiliary system according to the result of the recognition, and sends the command to the wavelength control unit 60.

The wavelength control unit 60 drives the auxiliary system and controls the wavelength to be handled by the auxiliary system in the same manner as that in the first embodiment according to the wavelength control command sent from the switching control unit 100. The current system associated with the wavelength is then switched to the auxiliary system. However, unlike that in the first embodiment, a current system to be switched operates normally.

As mentioned above, according to the third embodiment, when a current system in a local station which has failed is switched to an auxiliary system, the switched state is conveyed to a remote station. A corresponding current system in the remote station is then switched to an auxiliary system in line with the local station. Consequently, if a failure occurs, switching can be made concurrently in both a local station and a remote station, that is, one optical transmission line can be switched to another. A range of variation of system construction can therefore be expanded. In the WDM transmission approach, physically, one optical transmission line is used for each of transmission and reception (one pair of optical fibers). Optically, this means that there are the same number of transmission lines as the number of multiplex wavelengths. If a WDM transmission system is configured so that one transmission line is switched to another in case of a failure, a flexible redundant configuration can be constructed. For example, an application in which if one transmission channel fails, the channel is switched to another channel can be coped with by the WDM transmission system. Specifically, in the aforesaid embodiments, a wavelength to be handled by an auxiliary system can be set to either a wavelength $\lambda 1$ or $\lambda 2$. If the wavelength can also be set to another wavelength $\lambda 3$, another transmission line can be constructed. A difference between the wavelengths $\lambda 1$ and $\lambda 2$ gets smaller because of time-passing changes of components concerned. In this case, it may become hard for a reception unit to identify a wavelength. In this case, if a current system associated with one of the wavelengths is switched to an auxiliary system associated with the wavelength $\lambda 3$ for each transmission line (remote station), the WDM transmission system can be rescued.

Next, a fourth embodiment in accordance with the present invention will be described.

In the fourth embodiment, unlike the third embodiment, it is not carried out that a switching control command is superposed on an optical output in order to convey a state, in which a current system is switched to an auxiliary system, to a remote station. Instead, a remote station judges the state, in which a current system is switched to an auxiliary system, on the basis of intermittent discontinuity of an optical output.

Figure 12:
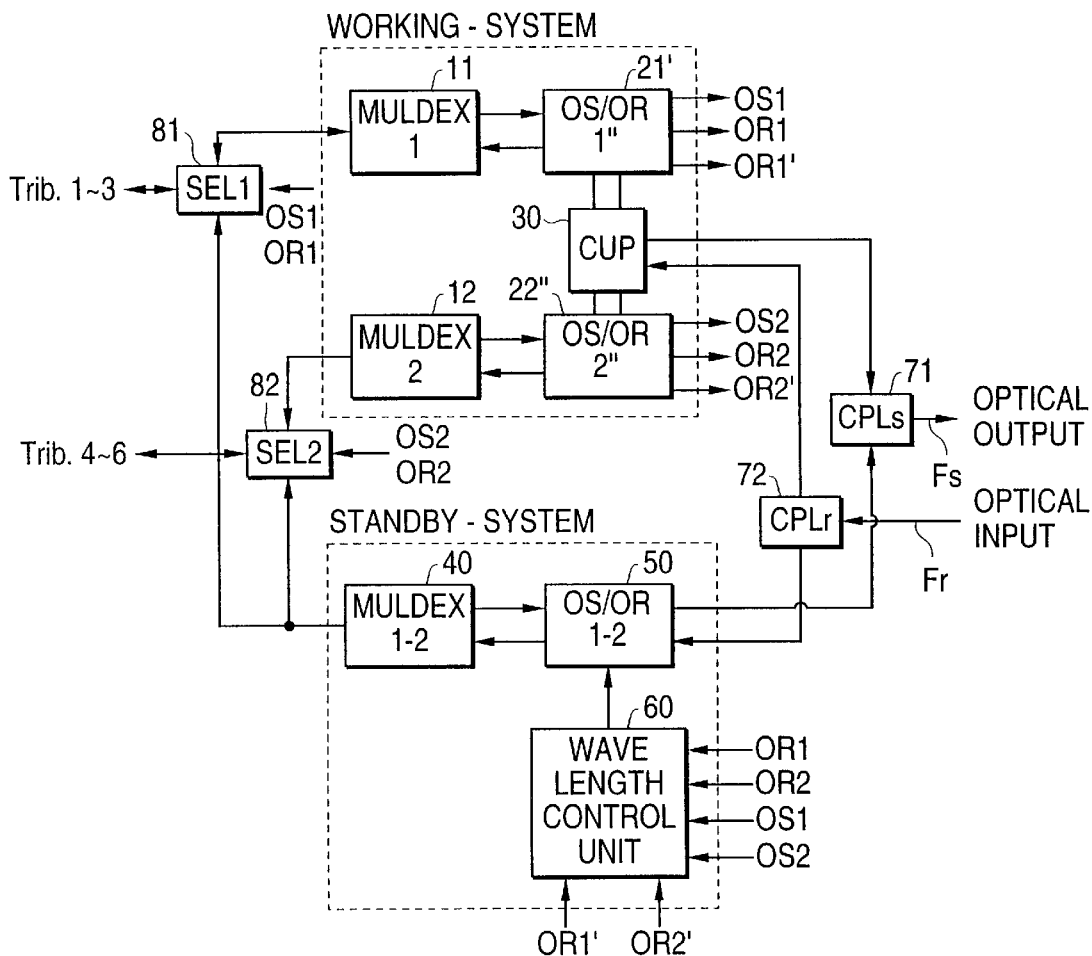
FIG. 12 is a block diagram showing the configuration of a WDM transmitter receiver of a fourth embodiment in accordance with the present invention.

FIG. 12 is a block diagram showing the configuration of a WDM transmitter receiver of the fourth embodiment. Components identical to those in the first embodiment shown in FIG. 4 are assigned the same reference numerals. The description of the components will be omitted.

In FIG. 12, the configuration of the WDM transmitter receiver is different from that in the first embodiment in a point that optical transmission/reception units 21" and 22" (OS/OR1" and OS/OR2") are substituted for the optical transmission/reception units 21 and 22 in the first embodiment. The other components are identical to those in the first embodiment.

The optical transmission/reception unit 21" includes the same facilities as the optical transmission/reception unit 21 in the first embodiment. In addition, the optical reception unit 21R has the ability to sense intermittent discontinuity of an optical input. Specifically, when a light wave with a wavelength $\lambda 1$ having propagated the optical fiber Fr, been bifurcated by the optical coupler 72 and optical coupler unit 30, and then passed through the optical filter 21F is received by the optical reception unit 21R, if intermittent discontinuity of the optical input is sensed, an intermittent discontinuity alarm signal OR1' makes a low-to-high transition. Intermittent discontinuity of an optical input occurs at intervals of a period proportional to a wavelength associated-with a system in a remote station when the system is switched to an auxiliary system. When the intermittent discontinuity alarm signal OR1' is driven high, it is judged that a current system in the remote station associated with the wavelength $\lambda 1$ is switched to the auxiliary system. The intermittent discontinuity alarm signal OR1' is sent to the wavelength control unit 60.

The optical transmission/reception unit 22" has the same configuration as the optical transmission/reception unit 21". The optical transmission/reception unit 22" senses intermittent discontinuity of an optical input with a wavelength $\lambda 2$ and outputs a high-level intermittent discontinuity alarm signal OR2' to the wavelength control unit 60.

With generation of the high-level intermittent discontinuity alarm signal OR1' or intermittent discontinuity alarm signal OR2', the wavelength control unit 60 drives the auxiliary system, controls a wavelength to be handled by the auxiliary system, and then switches the current system associated with the wavelength to the auxiliary system in the same manner as that in the first embodiment. However, unlike the first embodiment, the current system to be switched operates normally.

Table 3 below lists states of signals and the like indicating operations performed when a failure occurs in a local station and a corresponding system in a remote station is switched.

TABLE 3

| Failure in local station | Normal state | System 1 fails | System 2 fails |
|---|---|---|---|
| Intermittent discontinuity signal OR1' in remote station | Low | High | Low |
| Intermittent discontinuity signal OR2' in remote station | Low | Low | High |
| LD wavelength control signal in remote station | V0 | V1 | V2 |
| Passband-of-wavelengths control signal in remote station | v0 | v1 | v2 |
| Selected wavelength - to be handled by auxiliary system in remote station | — | $\lambda 1$ | $\lambda 2$ |

When a local station operates normally, the intermittent discontinuity alarm signals OR1' and OR2' in a remote station remain low. No current system is switched to the auxiliary system. If system 1 in the local station fails, the intermittent discontinuity alarm signal OR1' in the remote station is driven high. This causes the LD wavelength control signal and passband-of-wavelengths control signal to assume voltages V1 and v1 respectively. A selected wavelength to be handled by the auxiliary system is set to the wavelength λ1. By contrast, if system 2 in the local station fails, the intermittent discontinuity alarm signal OR2' in the remote station is driven high. This causes the LD wavelength control signal and passband-of-wavelengths control signal to assume voltages V2 and v2 respectively. The selected wavelength to be handled by the auxiliary system is then set to the wavelength λ2.

As mentioned above, according to the fourth embodiment, the optical transmission/reception units 21" and 22" sense intermittent discontinuity of an optical input. A current system is switched to the auxiliary system with generation of the high-level intermittent discontinuity alarm signals OR1' and OR2'. Owing to this configuration, intermittent discontinuity of an optical output occurring in a local station when a failing current system is switched to the auxiliary system is sensed as intermittent discontinuity of an optical input in a remote station. The state in the local station in which the current system is switched to the auxiliary system is thus conveyed. Despite the simpler configuration, switching (switching one optical transmission line to another) can be achieved concurrently in both a local station and remote station.

In the aforesaid first to fourth embodiments, if one system associated with a wavelength fails, a transmitting/receiving part of the system is switched to an auxiliary system. The present invention is not limited to this mode. Alternatively, only a transmitting part or receiving part that has failed may be switched to an auxiliary system.

The third and fourth embodiments have been described on the assumption that the number of multiplex wavelengths is two. Similarly to the second embodiment, the third and fourth embodiments are apparently applicable to a configuration in which the number of multiplex wavelengths is n. Furthermore, occurrence of a failure is conveyed to a remote station with switching of a current system in a local station to an auxiliary system. Alternatively, since occurrence of a failure to the remote station should merely be conveyed with sensing of a failure, a WDM transmitter receiver may be configured so that, for example, after a failure is sensed, before a failing system in a local station is switched to an auxiliary system, the occurrence of the failure is conveyed to a remote station.

The present invention is not limited to the aforesaid embodiments. From the above description, it will be apparent to people with ordinary skill in the art that variants can be formed.

What is claimed is:

1. A wavelength division multiplexing transmitter receiver for transmitting and receiving a plurality of light waves with different wavelengths by combining and separating them, comprising:
 a plurality of working system processing means, associated with the wavelengths of the plurality of light waves, for processing the plurality of light waves;
 a standby-system processing means capable of handling all the wavelengths of the plurality of light waves;
 a standby-system control means that if any of said plurality of working system processing means fails, controls said standby-system processing means by generating a wavelength control signal used to change the wavelength of a light wave to be processed by said standby-system processing means according to the wavelength of a light wave being processed by a working system processing means that has failed; and
 a switching means for switching said working system processing means that has failed to said standby-system processing means.

2. A wavelength division multiplexing transmitter receiver according to claim 1, wherein said standby-system processing means includes a light-emitting unit capable of emitting the plurality of light waves with different wavelengths, and an emission wavelength control unit for changing the wavelength of light to be emitted by said light-emitting unit according to the wavelength control signal.

3. A wavelength division multiplexing transmitter receiver according to claim 1, wherein said standby-system processing means includes a light-receiving unit capable of receiving the plurality of light waves with different wavelengths.

4. A wavelength division multiplexing transmitter receiver according to claim 3, wherein said standby-system processing means includes a variable optical filter capable of varying the passband of wavelengths according to the wavelength control signal, and a light wave passing through said variation optical filter is received by said light- receiving unit.

5. A wavelength division multiplexing transmitter receiver according to claim 1, further comprising an occurrence-of-failure conveying means for conveying the fact that any of said plurality of working system processing means has failed to a wavelength division multiplexing transmitter receiver in a remote station connected over an optical transmission line.

6. A wavelength division multiplexing transmitter receiver according to claim 5, wherein said occurrence-of-failure conveying means includes an occurrence-of-failure signal production unit for producing an occurrence-of-failure signal indicating that any of said plurality of working system processing means has failed, and a signal superposition unit for superposing the occurrence-of-failure signal on a multiplexed light wave to be transmitted over said optical transmission line, and transmitting a resultant light wave.

7. A wavelength division multiplexing transmitter receiver according to claim 5, wherein said occurrence-of-failure conveying means conveys occurrence of a failure in any of said plurality of working system processing means to said wavelength division multiplexing transmitter receiver in a remote station on the basis of intermittent discontinuity of a multiplexed light wave, which stems from the occurrence of the failure, being transmitted over said optical transmission line.

8. A redundant system switching method for a wavelength division multiplexing transmitter receiver, having current systems and an auxiliary system, for transmitting and receiving a plurality of light waves with different wavelengths by combining and separating them, comprising:
 a local station switching step at which if a current system for processing any of the plurality of light waves fails, a wavelength to be handled by an auxiliary system in a local station is controlled according to the wavelength of the light wave, and the current system that has failed is switched to the auxiliary system in the local station;
 an occurrence-of-failure conveying step of conveying occurrence of a failure in the local station to a wavelength division multiplexing transmitter receiver in a remote station connected over said optical transmission line; and a remote station switching step of controlling a wavelength to be handled by an auxiliary system in the remote station according to the occurrence of the failure conveyed from the local station, and switching a corresponding current system in the remote station to the auxiliary system in the remote station.

9. A redundant system switching method for a wavelength division multiplexing transmitter receiver according to claim 8, wherein said occurrence-of-failure conveying step includes a step of producing an occurrence- of-failure signal indicating occurrence of a failure in a local station, and a step of superposing the occurrence-of- failure signal on a multiplexed light wave to be transmitted over said optical transmission line.

10. A redundant system switching method for a wavelength division multiplexing transmitter receiver according to claim 8, wherein at said occurrence-of-failure conveying step, occurrence of a failure in the local station is conveyed to the remote station on the basis of intermittent discontinuity of a multiplexed light wave, which stems from the occurrence of the failure, being transmitted over said optical transmission line.

11. An optical transmission system including at least first and second terminal stations each having a wavelength division multiplexing transmitter receiver for transmitting and receiving a plurality of light waves with different wavelengths by combining and separating them, wherein said first and second terminal stations each comprises:

a plurality of working system processing means, associated with the wavelengths of the plurality of light waves, for processing the plurality of light waves;

a standby-system processing means capable of handling all the wavelengths of the plurality of light waves;

a standby-system control means that if any of said plurality of working system processing means fails, controls said standby-system processing means by generating a wavelength control signal used to change the wavelength of a light wave to be processed by said standby-system processing means according to the wavelength of a light wave being processed by a working system processing means that has failed; and a switching means for switching said working system processing means that has failed to said standby-system processing means.

12. An optical transmission system according to claim 11, further comprising an occurrence-of-failure conveying means that if a working system processing means in said first terminal station fails, conveys the fact that the working system processing means is switched to said standby-system processing means to said second terminal station.

13. An optical transmission system according to claim 12, wherein in said second terminal station, when failure information sent from said first terminal station is detected, said working system processing means is switched to said standby-system processing means.

* * * * *